United States Patent
Inoue

(10) Patent No.: US 10,238,969 B2
(45) Date of Patent: *Mar. 26, 2019

(54) RECORDING MEDIUM STORING GAME PROGRAM, GAME PROCESSING METHOD, AND INFORMATION PROCESSING APPARATUS

(71) Applicant: GREE, Inc., Tokyo (JP)

(72) Inventor: Kenji Inoue, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,702

(22) Filed: Jun. 5, 2017

(65) Prior Publication Data

US 2017/0266555 A1 Sep. 21, 2017

Related U.S. Application Data

(63) Continuation of application No. 14/550,162, filed on Nov. 21, 2014, now Pat. No. 9,700,793.

(30) Foreign Application Priority Data

Feb. 26, 2014 (JP) .................................. 2014-034752

(51) Int. Cl.
*A63F 13/335* (2014.01)
*A63F 13/537* (2014.01)

(52) U.S. Cl.
CPC .......... *A63F 13/537* (2014.09); *A63F 13/335* (2014.09)

(58) Field of Classification Search
None
See application file for complete search history.

(56) References Cited

U.S. PATENT DOCUMENTS 7,491,124 B2 * 2/2009 Tanaka .................... A63F 13/12
463/42
9,011,239 B2 4/2015 Ikeda
(Continued)

FOREIGN PATENT DOCUMENTS

JP 2000-262738 A 9/2000
JP 2002-177651 A 6/2002
(Continued)

OTHER PUBLICATIONS

"Dragon Quest X: Awakening of the Five Race Online," Weekly Famitsu, No. 1195, Enterbrain, Inc., Oct. 27, 2011, vol. 26, No. 46, pp. 46-51.
(Continued)

*Primary Examiner* — Ronald Laneau
(74) *Attorney, Agent, or Firm* — Maier & Maier, PLLC

(57) ABSTRACT

A terminal apparatus includes a storage device that stores state information of game contents changing according to progress of a game; a screen information generator that generates first information relating to a display of the game contents on a display screen and second information relating to a display of the state information on the display screen; an output device that outputs the first information and the second information to the display screen at a predetermined timing, respectively; and an instruction receiving device that receives a switching instruction to switch between display of the game contents and display of the state information on the display screen, wherein the screen information generator generates the second information based on latest state information stored on the storage device at a time when receiving the switching instruction.

18 Claims, 9 Drawing Sheets

(56) References Cited

U.S. PATENT DOCUMENTS

| | | | | |
|---|---|---|---|---|
| 2002/0160838 A1* | 10/2002 | Kim | ...................... | G06Q 10/00 463/42 |
| 2013/0310167 A1 | 11/2013 | Kelly et al. | | |
| 2013/0310169 A1* | 11/2013 | Satsuma | ................. | A63F 13/35 463/30 |
| 2014/0157144 A1 | 6/2014 | Mizushima et al. | | |
| 2014/0295977 A1 | 10/2014 | Yoshie | | |

FOREIGN PATENT DOCUMENTS

| | | | |
|---|---|---|---|
| JP | 2003-108844 A | 4/2003 | |
| JP | 2011-078634 A | 4/2011 | |
| JP | 2011-141867 A | 7/2011 | |
| JP | 2012-024248 A | 2/2012 | |
| JP | 2013-230229 A | 11/2013 | |
| JP | 5721876 B | 4/2015 | |

OTHER PUBLICATIONS

Manual of "Final Fantasy III," Square Enix, National Center for Industrial Property Information and Training, Sep. 21, 2012, pp. 1-31.

"Smartphone app development in GREE—Native edition," CodeZine, Mar. 15, 2013, http://codezine.jp/article/detail/7032.

Biohazard team survive together with everyone, the Dec. number of Monthly Applistyle, East Press Corporatio, Oct. 28, 2013, vol. 1, No. 11, p. 079 (translations of relevant sections).

English translation of Notice of Reasons for Rejection of JP Application No. 2014-034752, dated Jun. 3, 2014.

English translation of Notice of Reasons for Rejection of JP Application No. 2014-034752, dated Sep. 30, 2014.

Notice of Reasons for Rejection dated May 26, 2015 of corresponding Japanese Application No. 2015-061591 along with its English translation.

Japanese Notice of Reasons for Rejection dated Jul. 21, 2015 w/English translation from corresponding Japanese Application No. 2015-061591.

Gree Inc. Exhibit 2002: Curriculum Vitae of David Crane, in connection with USPTO, PTAB, Supercell Oy, Petitioner, v. Gree, Inc., Patent Owner, Case PGR2018-00061, U.S. Pat. No. 9,700,793, 6 pages.

Gree, Inc. Exhibit 2001: Declaration of David Crane, in connection with USPTO, PTAB, Supercell Oy, Petitioner, v. Gree, Inc., Patent Owner, Case PGR2018-00061, U.S. Pat. No. 9,700,793, 18 pages.

Paper: Patent Owner's Preliminary Response to Petition for Post Grant Review of U.S. Pat. No. 9,700,793, dated Jul. 18, 2018, in connection with USPTO, PTAB, Supercell Oy, Petitioner, v. Gree, Inc., Patent Owner, Case PGR2018-00061, U.S. Pat. No. 9,700,793, 87 pages.

Gree Inc. Exhibit 2003: Electronic Acknowledgment Receipt issued on Jul. 18, 2018, in connection with USPTO, PTAB, Supercell Oy, Petitioner, v. Gree, Inc., Patent Owner, Case PGR2018-00061, U.S. Pat. No. 9,700,793, 8 pages.

"Petition for Post Grand Review of U.S. Pat. No. 9,700,793," dated Apr. 10, 2018, cover page, pp. i-ix and 1-70.

"Memorandum" from Deputy Commissioner to Patent Examining Corps re Eligibly Decisions, dated May 19, 2016, Exhibit 1004, pp. 1-2.

"Memorandum" from Deputy Commissioner to Patent Examining Corps re Eligibly Decisions, dated Nov. 2, 2016, Exhibit 1005, pp. 1-4.

"Subject Matter Eligibly Examples: Business Methods," *Supercell Oy*, dated Dec. 2016, Exhibit 1006, pp. 1-17.

Paper Decision Institution of Post-Grant Review, entered Oct. 16, 2018, in connection with USPTO, PTAB, *Supercell Oy*, Petitioner, v. *Gree, Inc.*, Patent Owner, Case PGR2018-00061, U.S. Pat. No. 9,700,793 B2, 22 pages.

Gree Inc. Exhibit 2005: Curriculum Vitae of David Crane, in connection with USPTO, PTAB, *Supercell Oy*, Petitioner, v. *Gree, Inc.*, Patent Owner, Case PGR2018-00061, U.S. Pat. No. 9,700,793, 7 pages.

Gree, Inc. Exhibit 2004: Declaration of David Crane, in connection with USPTO, PTAB, *Supercell Oy*, Petitioner, v. *Gree, Inc.*, Patent Owner, Case PGR2018-00061, U.S. Pat. No. 9,700,793, 46 pages.

Paper: Patent Owner's Response to Petition for Post Grant Review of U.S. Pat. No. 9,700,793, dated Jan. 25, 2019, in connection with USPTO, PTAB, *Supercell Oy*, Petitioner, v. *Gree, Inc.*, Patent Owner, Case PGR2018-00061, U.S. Pat. No. 9,700,793, 86 pages.

Gree, Inc. Exhibit 2007: USPTO Revised Guidance, in connection with USPTO, PTAB, *Supercell Oy*, Petitioner, v. *Gree, Inc.*, Patent Owner, Case PGR2018-00061, U.S. Pat. No. 9,700,793, 9 pages.

Gree, Inc. Exhibit 2006: USPTO Berkheimer Memorandum, in connection with USPTO, PTAB, *Supercell Oy*, Petitioner, v. *Gree, Inc.*, Patent Owner, Case PGR2018-00061, U.S. Pat. No. 9,700,793, 6 pages.

* cited by examiner

RECORDING MEDIUM STORING GAME PROGRAM, GAME PROCESSING METHOD, AND INFORMATION PROCESSING APPARATUS

TECHNICAL FIELD

This disclosure relates to a recording medium storing a game program, a game processing method, and an information processing apparatus and, in particular, a recording medium storing a game program, a game processing method, and an information processing apparatus which process the progress of a game using game contents.

BACKGROUND

In recent years, with the spread of electronic devices such as a smartphone and a tablet, in addition to games for a home video game machine, games for an electronic device are being actively developed.

For example, Japanese Unexamined Patent Application Publication No. 2012-024248 discloses a game played on a client terminal such as a mobile terminal, and progresses while performing communication between the client terminal and a server apparatus.

The games for an electronic device are generally classified into a native game in which arithmetic processing is performed on a client terminal side, a browser game disclosed in JP '248 in which arithmetic processing is performed on a server side on a network, and a hybrid type game which is halfway between the native game and the browser game.

In the browser game, since arithmetic processing is performed on the server side which is a high performance terminal, the display possibility or the display speed of the game screen primarily depends on a communication state.

In the native game, while there is no relationship with the communication state, since arithmetic processing is performed on the client terminal side, the display possibility or the display speed of the game screen primarily depends on the performance of hardware of the client terminal.

Accordingly, in both games, to display the game screen without a load, a method which simply reduces the amount of information displayed on one screen is commonly used.

However, in the games for an electronic device, more advanced and complicated games are developed, and improvement of a technique to display the game screen is required.

It could be helpful to provide a terminal apparatus, a recording medium storing a game program, a game processing method, and an information processing apparatus capable of reducing the influence of a communication state or performance of hardware by generating a game screen with information to be displayed on the game screen as the latest information at the timing when an instruction to update is received.

SUMMARY

I provide a terminal apparatus including a storage device that stores state information of game contents changing according to progress of a game; a screen information generator that generates first information relating to a display of the game contents on a display screen and second information relating to a display of the state information on the display screen; an output device that outputs the first information and the second information to the display screen at a predetermined timing, respectively, and an instruction receiving device that receives a switching instruction to switch between display of the game contents and display of the state information on the display screen, wherein the screen information generator generates the second information based on latest state information stored on the storage device at a time when receiving the switching instruction.

I also provide a method of controlling a computer that processes progress of a game using game contents, the method including storing state information of game contents changing according to progress of the game; generating first information relating to a display of the game contents on a display screen and second information relating to a display of the state information on the display screen; outputting the first information and the second information to the display screen at a predetermined timing, respectively; and receiving a switching instruction to switch between display of the game contents and display of the state information on the display screen, wherein the second information is generated based on latest state information stored at a time when receiving the switching instruction.

I further provide a non-transitory recording medium recording a program for causing a computer to execute steps of storing state information of game contents changing according to progress of a game; generating first information relating to a display of the game contents on a display screen and second information relating to a display of the state information on the display screen; outputting the first information and the second information to the display screen at a predetermined timing, respectively; and receiving a switching instruction to switch between display of the game contents and display of the state information on the display screen, wherein the second information is generated based on latest state information stored at a time when receiving the switching instruction.

I also provide a recording medium for storing a game program which processes progress of a game, the game program when executed on a computer causes the computer to execute: instructions for storing basic information of game contents and state information changing according to progress of the game, receiving an instruction from a user, generating information relating to a game screen based on a received instruction, and outputting information relating to the generated game screen to a user terminal at a predetermined time, wherein the screen information relates to a first game screen that displays game contents and information relating to a second game screen that displays state information of the game contents, and the second game screen includes latest state information at a time when receiving a first instruction which is an instruction to update the state information.

I also provide a recording medium, which further executes: generating information relating to the second game screen such that the second game screen becomes a screen having transparency, and outputting information relating to the first game screen and information relating to the second game screen such that switching display of the first game screen and a superimposed screen of the first game screen and the second game screen is possible.

I also provide a recording medium, which further executes: outputting information relating to the first game screen and information relating to the second game screen such that switching display of the first game screen and the second game screen is possible.

I also provide a recording medium, which further executes: generating information relating to the second game screen such that the second game screen becomes a screen having transparency, and outputting information relating to the first game screen and information relating to the second game screen such that switching display of the first game screen and a superimposed screen of the first game screen and the second game screen is possible, wherein the switching display is performed at a time different from a time when the first instruction is received.

I also provide a recording medium, which further executes: selecting state information according to a situation based on the progress of the game at a time of receiving a first instruction which is an instruction to update the state information, acquires the latest state information of the selected state information, and generates information relating to the second game screen.

I also provide a recording medium, which further executes: receiving user selection of state information included in information relating to the second game screen from the state information, and acquiring latest state information of the selected state information based on the received selection at a time of receiving a first instruction which is an instruction to update the state information, and generates information relating to the second game screen.

I also provide a recording medium, which further executes: receiving user selection of a strategy in the game, and selecting state information according to selection based on the received selection at a time of receiving a first instruction which is an instruction to update the state information, acquires the latest state information of the selected state information, and generates information relating to the second game screen.

I also provide a recording medium, wherein the computer and the user terminal are connected through a network, and the switching display is performed in a non-communication state.

I also provide a recording medium storing a game program which processes progress of a game, the game program causing a computer to execute: storing basic information of game contents and state information changing according to progress of the game, receiving an instruction from a user, generating information relating to a game screen based on a received instruction, and outputting information relating to the generated game screen to a user terminal at a predetermined time, wherein the game program processes the progress of a game in which a plurality of game contents including game contents corresponding to one user terminal perform a battle.

I also provide a recording medium storing a game program, wherein receiving an instruction from the user terminal is by a smart device having a touch panel as a main user interface device.

I further provide a method of processing progress of a game including a storage step in which a storage device of an information processing apparatus stores basic information of game contents and state information changing according to the progress of the game, an instruction receiving step in which instruction receiving devices of the information processing apparatus receives an instruction from a user, a screen information generation step in which a screen information generator of the information processing apparatus generates information relating to a game screen based on the instruction received in the instruction receiving step, and an output step in which an output device of the information processing apparatus outputs information relating to the game screen generated in the screen information generation step to a user terminal at a predetermined time, wherein, in the screen information generation step, information relating to a first game screen that displays the game contents and information relating to a second game screen includes latest state information at a time when a first instruction which is an instruction to update the state information is received in the instruction receiving step.

I also provide a method, wherein, in the screen information generation step, information relating to the second game screen is generated such that the second game screen becomes a screen having transparency and, in the output step, information relating to the first game screen and information relating to the second game screen are output such that switching display of the first game screen and a superimposed screen of the first game screen and the second game screen is possible.

I also provide a method wherein, in the output step, information relating to the first game screen and information relating to the second game screen are output such that switching display of the first game screen and the second game screen is possible.

I also provide a method wherein the switching display is performed at a time different from the time when the first instruction is received.

I also provide a method wherein, in the screen information generating step, state information according to a situation is generated based on the progress of the game at a time when a first instruction which is an instruction to update the state information is received in the instruction receiving step, the latest state information of the selected state information is acquired from the storage step, and information relating to the second game screen is generated.

I also provide a method of processing progress of a game including a storage step in which a storage device of an information processing apparatus stores basic information of game contents and state information changing according to the progress of the game, an instruction receiving step in which instruction receiving devices of the information processing apparatus receives an instruction from a user, a screen information generation step in which a screen information generator of the information processing apparatus generates information relating to a game screen based on the instruction received in the instruction receiving step, and an output step in which an output device of the information processing apparatus outputs information relating to the game screen generated in the screen information generation step to a user terminal at a predetermined time, wherein, in the screen information generation step, information relating to a first game screen that displays the game contents and information relating to a second game screen includes latest state information at a time when a first instruction which is an instruction to update the state information is received in the instruction receiving step, wherein, in the screen information generation step, information relating to the second game screen is generated such that the second game screen becomes a screen having transparency, and in the output step, information relating to the first game screen and information relating to the second game screen are output such that switching display of the first game screen and a superimposed screen of the first game screen and the second game screen is possible, further including a strategy selection receiving step of receiving user selection of a strategy in the game, wherein, in the screen information generation step, state information according to selection is selected based on the selection received in the strategy selection receiving step at a time when a first instruction which is an instruction to update the state information is received in the instruction receiving step, the latest state information of the selected state information is acquired from the storage step, and information relating to the second game screen is generated.

I further provide an information processing apparatus which processes progress of a game including a storage device which stores basic information of game contents and state information changing according to the progress of the game, an instruction receiving device that receives an instruction from a user, a screen information generator that generates information relating to a game screen based on an instruction received by the instruction receiving device, and an output device that outputs information relating to the game screen generated by the screen information generator to a user terminal at a predetermined timing, wherein the screen information generator generates information relating to a first game screen that displays the game contents and information relating to a second game screen that displays the state information of the game contents, and information relating to the second game screen includes latest state information at a time when the instruction receiving device receives a first instruction, which is an instruction to update the state information.

I also provide an information processing apparatus, wherein the screen information generator generates information relating to the second game screen such that the second game screen becomes a screen having transparency, and the output device outputs information relating to the first game screen and information relating to the second game screen such that switching display of the first game screen and a superimposed screen of the first game screen and the second game screen is possible.

I also provide an information processing apparatus, wherein the output device outputs information relating to the first game screen and information relating to the second game screen such that switching display of the first game screen and the second game screen is possible.

I also provide an information processing apparatus, wherein the screen information generator selects state information according to a situation based on the progress of the game at a time when the instruction receiving device receives a first instruction which is an instruction to update the state information, acquires the latest state information of the selected state information from the storage unit, and generates information relating to the second game screen.

It is thus possible to reduce the influence of a communication state or performance of hardware by generating a game screen with information to be displayed on the game screen as the latest information at the timing when an instruction to update is received.

DETAILED DESCRIPTION

Figure 1:
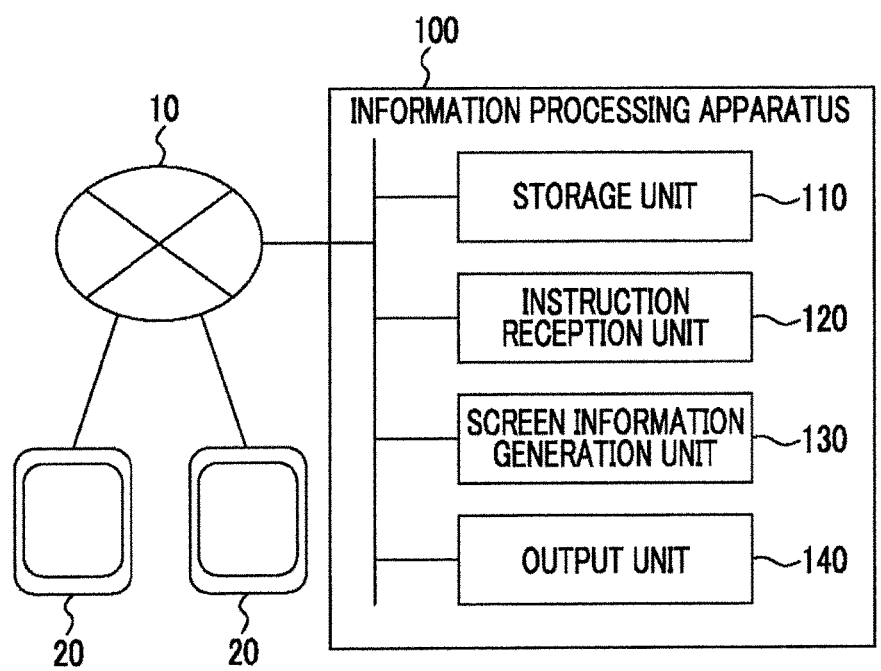
FIG. 1 is a schematic block diagram showing an example of an information processing apparatus.

I provide a recording medium storing a game program which processes the progress of a game, a game program causing a computer to execute a storage function of storing basic information of the game contents and state information changing according to the progress of the game, an instruction receiving function of receiving an instruction from a user, a screen information generation function of generating information relating to a game screen based on the instruction received by the instruction receiving function, and an output function of outputting information relating to the game screen generated by the screen information generation function to a user terminal at a predetermined timing, in which the screen information generation function generates information relating to a first game screen that displays game contents and information of a second game screen that displays state information of the game contents, and information relating to the second game screen includes the latest state information at a time when the instruction receiving function receives a first instruction which is an instruction to update the state information.

The screen information generation function may generate information relating to the second game screen such that the second game screen becomes a screen having transparency, and the output function may output information relating to the first game screen and information relating to the second game screen such that switching display of the first game screen and a superimposed screen of the first game screen and the second game screen is possible.

The output function may output information relating to the first game screen and information relating to the second game screen such that switching display of the first game screen and the second game screen is possible.

The switching display may be performed at a time different from the time when the first instruction is received.

The screen information generation function may select state information according to a situation based on the progress of the game at a time when the instruction receiving function receives a first instruction which is an instruction to update the state information, may acquire the latest state information of the selected state information from the storage function, and may generate information relating to the second game screen.

The game program may cause the computer to further execute an information selection receiving step of receiving user selection of state information included in information relating to the second game screen from the state information, and the screen information generation step may acquire the latest state information of the selected state information based on the selection received by the information selection receiving step at a time when the instruction receiving function receives a first instruction which is an instruction to update the state information, and may generate information relating to the second game screen.

The game program may cause the computer to further execute a strategy selection receiving step of receiving user selection of a strategy in the game, and the screen information generation step may select state information according to selection based on the selection received by the strategy selection receiving step at a time when the instruction receiving step receives a first instruction which is an instruction to update the state information, may acquire the latest state information of the selected state information from the storage step, and may generate information relating to the second game screen.

The computer and the user terminal may be connected through a network, and the switching display may be performed in a non-communication state.

The game program may process the progress of a game in which a plurality of game contents including game contents corresponding to one user terminal perform a battle.

The instruction receiving step may receive an instruction from the user terminal which is a smart device having a touch panel as a main user interface device.

I also provide a game processing method which processes the progress of a game, the game processing method including a storage step in which storage means of an information processing apparatus stores basic information of game contents and state information changing according to the progress of the game, an instruction receiving step in which instruction receiving means of the information processing apparatus receives an instruction from a user, a screen information generation step in which screen information generation means of the information processing apparatus generates information relating to a game screen based on the instruction received in the instruction receiving step, and an output step in which output means of the information processing apparatus outputs information relating to the game screen generated in the screen information generation step to a user terminal at a predetermined timing, in which, in the screen information generation step, information relating to a first game screen that displays the game contents and information relating to a second game screen that displays the state information of the game contents are generated, and information relating to the second game screen includes the latest state information at the time when a first instruction which is an instruction to update the state information is received in the instruction receiving step.

I further provide an information processing apparatus which processes the progress of a game, the information processing apparatus including a storage unit which stores basic information of the game contents and state information changing according to the progress of the game, an instruction receiving unit that receives an instruction from a user, a screen information generation unit that generates information relating to a game screen based on the instruction received by the instruction receiving unit, and an output unit which outputs information relating to the game screen generated by the screen information generation unit to a user terminal at a predetermined timing, in which the screen information generation unit generates information relating to a first game screen that displays the game contents and information relating to a second game screen that displays the state information of the game contents, and information relating to the second game screen includes the latest state information at the timing when the instruction receiving unit receives a first instruction, which is an instruction to update the state information.

An example of an information processing apparatus will be described in detail referring to the drawings.

FIG. 1 is a functional block diagram showing an example of an information processing apparatus. As shown in FIG. 1, the information processing apparatus is an information processing apparatus 100 which processes the progress of a game using game contents, and includes a storage unit 110, an instruction receiving unit 120, a screen information generation unit 130, and an output unit 140. In FIG. 1, an example where the information processing apparatus 100 connects to one or more user terminals 20 through a network 10 is shown.

In this example, a description will be provided assuming that the game is a game in which groups having a plurality of users perform a battle in real time.

The game contents is a generic term of electronic data used by a user for the progress of the game and can be, for example, a card, a character, an avatar or the like.

The game contents has basic information which is fundamental information (name, rarity, attribute, level, in-event position, and/or lethal move) and state information which is information (vitality, state of offensive power, defensive power, or a special move, and the like) of the state changing according to the progress of the game.

The state information can include the number of attack combinations, the collaboration state of users, the time until the operation of a lethal move and the like, in addition to vitality and the like described above.

The in-event position of the basic information refers to the position in a group displayed on the game screen, and the position includes a front guard and a back guard. The state information of the game contents may also depend on the position.

The storage unit 110 stores the basic information and the state information of the game contents. The storage unit 110 can have, for example, at least one of a semiconductor memory, a magnetic disk device and an optical disk device. The storage unit 110 stores various programs and data used to control the information processing apparatus 100. The storage unit 110 stores, for example, a program which executes a game and outputs a result. The storage unit 110 also stores a program to execute event processing. The storage unit 110 may temporarily store temporary data relating to predetermined processing.

The instruction receiving unit 120 receives an instruction from a user. The instruction from the user can be, for example, an instruction to attack an opponent group, an instruction to support another user belonging to the same group, an instruction to update state information described below or the like.

The screen information generation unit 130 generates information relating to a game screen based on the instruction received by the instruction receiving unit 120. The details of the game screen will be described below.

The output unit 140 outputs information relating to the game screen generated by the screen information generation unit 130 to a user terminal 20 at a predetermined time. The predetermined timing can be an arbitrary time such as at the time of the start of a battle or during a battle.

The screen information generation unit 130 generates information relating to a first game screen that displays the game contents and information relating to a second game screen that displays the state information of the game contents.

Figure 2B:
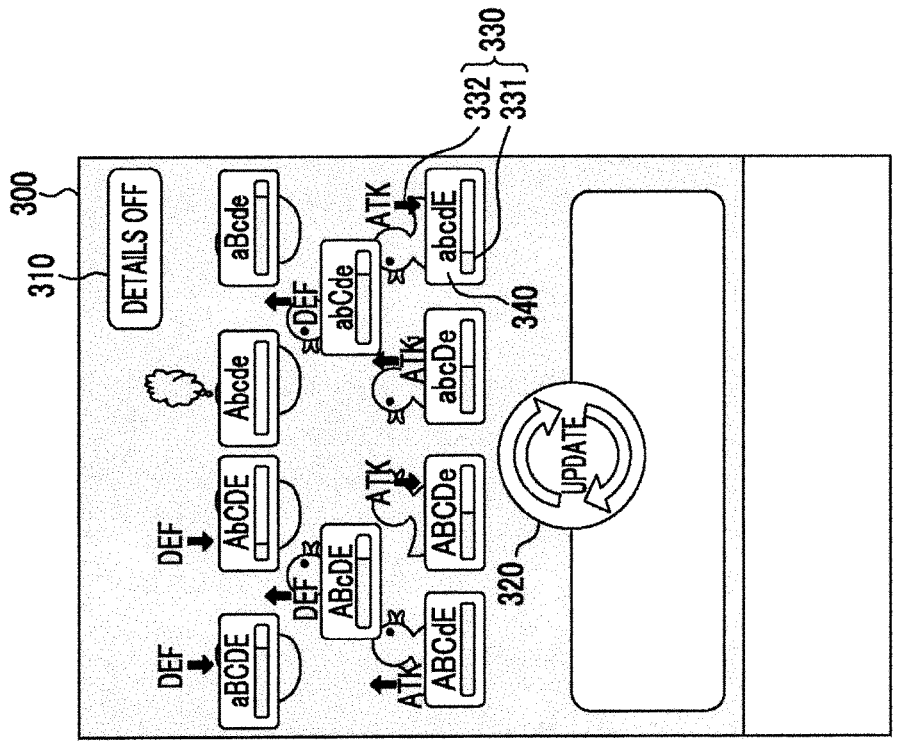
FIGS. 2A and 2B are schematic views showing an example of a game screen generated by the information processing apparatus.
Figure 2A:
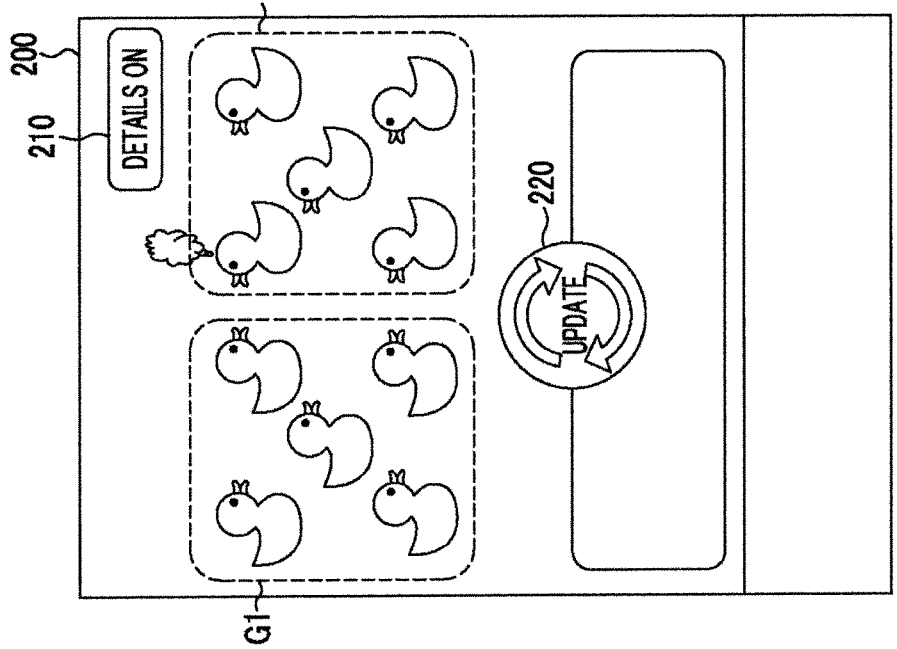

FIGS. 2A and 2B are schematic views showing an example of a game screen displayed on a display screen based on information relating to the game screen generated by the screen information generation unit 130. FIG. 2A shows a first game screen 200, and FIG. 2B shows a second game screen 300.

In the example of the first game screen 200 shown in FIG. 2A, a state in which a first group G1 and a second group G2 perform a battle is displayed and a duck character is displayed as game contents. A character can have all shapes such as a card, a human, an animal and a vehicle, for example, a ship.

In the example of the second game screen 300 shown in FIG. 2B, state information 330 of the game is displayed. In the example, as the state information 330, vitality 331 and a state 332 of offensive power or defensive power are displayed, and as basic information 340, the name of the character is displayed.

The vitality 331 can be displayed with original vitality and present vitality in a superimposed manner. The state 332 of offensive power or defensive power can be displayed with an arrow representing an increase or a decrease and characters (in the drawing, ATK representing attack power or DEF representing defense power) representing offensive power or defensive power.

Then, in both screens, switching buttons 210 and 310 that switch the first game screen 200 and the second game screen 300 and update buttons 220 and 320 to update the state information 330 can be arranged.

Then, in the information processing apparatus 100, information relating to the second game screen 300 is generated based on the latest state information at the time when the instruction receiving unit 120 receives a first instruction which is an instruction to update the state information.

The first instruction may be made, for example, by pressing the update buttons 220 and 320. Alternatively, the first instruction may be included in an instruction to attack by pressing an attack button (not shown) or the like.

According to the above-described configuration, generation of information relating to the second game screen 300 can be performed at the time when there is a margin in the processing of the game. It is thus possible to allow the game to progress without being affected by a communication state or hardware performance. Accordingly, for example, even when the game is performed through a network or even when the game is performed on a terminal with low hardware performance, it is possible to reduce the time required to process and realize smooth progress of the game.

The screen information generation unit 130 can generate information relating to the second game screen 300 such that the second game screen 300 becomes a screen having transparency, and the output unit 140 can output information relating to the first game screen 200 and information relating to the second game screen 300 such that switching the display of the first game screen 200 and a superimposed screen of the first game screen 200 and the second game screen 300 is possible.

Specifically, the screen information generation unit 130 can generate information relating to the second game screen 300 as information of an alpha layer having transparency. According to the configuration, it is possible to reduce the amount of information relating to the second game screen 300.

Alternatively, the output unit 140 can output information relating to the first game screen 200 and information relating to the second game screen 300 such that switching display of the first game screen 200 and the second game screen 300 is possible.

Specifically, the screen information generation unit 130 can generate information relating to the first game screen 200 and information relating to the second game screen 300 such that switching display of the first game screen 200 and the second game screen 300 as separate screens is possible.

The switching display can be performed by an operation to press the switching buttons 210 and 310 shown in FIGS. 2A and 2B. Alternatively, an appropriate display timing to confirm state information of other users without affecting the progress of the game may be determined, and switching the display may be performed automatically. The information processing apparatus may have means that provide the user with an appropriate display timing.

The switching display may be performed by, for example, an operation to tap, swipe or long press, which is a peculiar operation corresponding to a touch panel, in addition to pressing the switching buttons 210 and 310 by the user.

A display region of state information included in the second game screen 300 may be an operation region operable by the user. For example, if the user instructs a display region that displays that the offensive power of another user belonging to the same group has dropped, another user is supported, and the offensive power of supported another user increases. If the user instructs a display region that displays the defensive power of another user belonging to the same group has dropped, another user can be moved from a front guard to a back guard. With this, the second game screen 300 is not a simple information display screen, and operations can be diversified.

When displaying the second game screen 300, an expression by nonvisual means such as sound or vibration, for example, may be added. In the second game screen 300, the game contents of the user may be displayed (changed in color or the like) to be different from the game contents of other users.

The screen information generation unit 130 may generate information relating to another game screen, and the output unit 140 may output information such that switching display of the first game screen 200, the second game screen 300 and another game screen is possible.

The switching display can be performed at a time different from the time when the first instruction is received.

That is, the update timing and the switching display timing are different, whereby the update time is not required at the time of switching display. Accordingly, for example, even when the game is performed through a network or even when the game is performed on a terminal with low hardware performance, it is possible to further reduce the time required to process and realize a smoother progress of the game.

The screen information generation unit 130 can select state information according to a situation based on the progress of the game at the time when the instruction receiving unit 120 receives the first instruction which is the instruction to update the state information, can acquire the latest state information of the selected state information from the storage unit 110, and can generate information relating to the second game screen.

The state information according to the situation is, for example, an attribute or defensive power of each game contents in the first half of a battle and is vitality, a combination generation state or the like in the final stage of the battle.

The information processing apparatus 100 can further include an information selection receiving unit (not shown) which receives user selection of state information to be included in information relating to the second game screen 300 from the state information. Then, the screen information generation unit 130 can acquire the latest state information of the selected state information from the storage unit 110 based on the selection received by the information selection receiving unit at the time when the instruction receiving unit 120 receives the first instruction which is the instruction to update the state information, and can generate information relating to the second game screen 300. The user selection can be performed before the start of a battle or during the start. The selection may be performed by the user alone or by the group. When the selection is performed by the group, only the leader of the group may have the right to select.

The information processing apparatus 100 can further include a strategy selection receiving unit (not shown) which receives user selection of a strategy in the game. Then, the screen information generation unit 130 can select state information according to a strategy based on the selection received by the strategy selection receiving unit at the time when the instruction receiving unit receives the first instruction which is the instruction to update the state information, can acquire the latest state information of the selected state information from the storage unit 110, and can generate information relating to the second game screen 300. The strategy can be, for example, emphasis on offense, emphasis on defense or the like. With this configuration, for example, the leader of the group can input a strategy (emphasis on offense, emphasis on defense or the like), and state information required to execute the input strategy of the group can be specified by the information processing apparatus 100 and can be included in information relating to the second game screen 300 output to a user terminal belonging to the same group.

According to the above-described configuration, it is possible to investigate thoroughly and sort information necessary for an event from a large amount of information such as a user name, vitality, offensive power, defensive power, the number of cards, rarity, cost, an attribute, a user level, an in-event position (front guard/back guard), a combination state, a lethal move operation state, and the time until special move is operated, and to reduce the amount of information.

The update and switching operations are simple, whereby the user can focus on a battle and can enable the display of information necessary to form a strategy plan of a battle even on an electronic device such as a smartphone. That is, it is possible to obtain a maximum effect with a simple operation.

As shown in FIG. 1, the information processing apparatus 100 and the user terminal 20 can be connected through the network 10 and the switching display can be performed in a non-communication state.

This can be realized when the output unit 140 outputs the second game screen 300 after the update operation and before the switching operation. According to this, the time for communication is not required at the time of screen switching.

The information processing apparatus 100 can process the progress of a game in which a plurality of game contents including game contents corresponding to one user terminal 20 perform a battle.

The game is a game which is called a guild vs guild (GvG) battle, and in which groups having a plurality of users perform a battle. For example, it is assumed that a GvG battle is held as an event in a game in which a battle between one user and a character operated by a computer is performed as a main content. The GvG battle is performed in real time and the amount of information to be processed significantly increases compared to other cases.

Accordingly, in the real-time GvG battle, the information processing apparatus 100 is used, whereby it is possible to reduce the influence of a communication state or hardware performance.

The instruction receiving unit 120 can receive an instruction from the user terminal 20 which is a smart device having a touch panel as a main user interface.

The instruction receiving unit 120 can receive an instruction from a user terminal having a physical key-equipped panel on which a physical key is highlighted on the touch panel only when the user gives an instruction. In the physical key-equipped panel, a liquid arranged in the panel can be expanded at an appropriate timing according to an instruction of the processing apparatus to make the physical key appear.

The information processing apparatus 100 may function as a server apparatus connected to a user terminal through a network, or the user terminal 20 itself may include the information processing apparatus 100. In the former case, a game which is processed by the information processing apparatus 100 functions as a browser game, and in the latter case, the game functions as a native game.

When the information processing apparatus 100 functions as a server apparatus connected to the user terminal 20 through the network 10, the game may function as a hybrid game in which the first game screen 200 and the second game screen 300 are browser-displayed by the server apparatus and a menu screen and the like are native-displayed by the user terminal 20.

Although the user terminal 20 has been described as an electronic device such as a smartphone, consumer machines such as a home video game machine and a portable game machine which are game dedicated machines, may be used.

Subsequently, an example of the game which is processed by the information processing apparatus 100 will be described referring to the drawings.

Figure 3A:
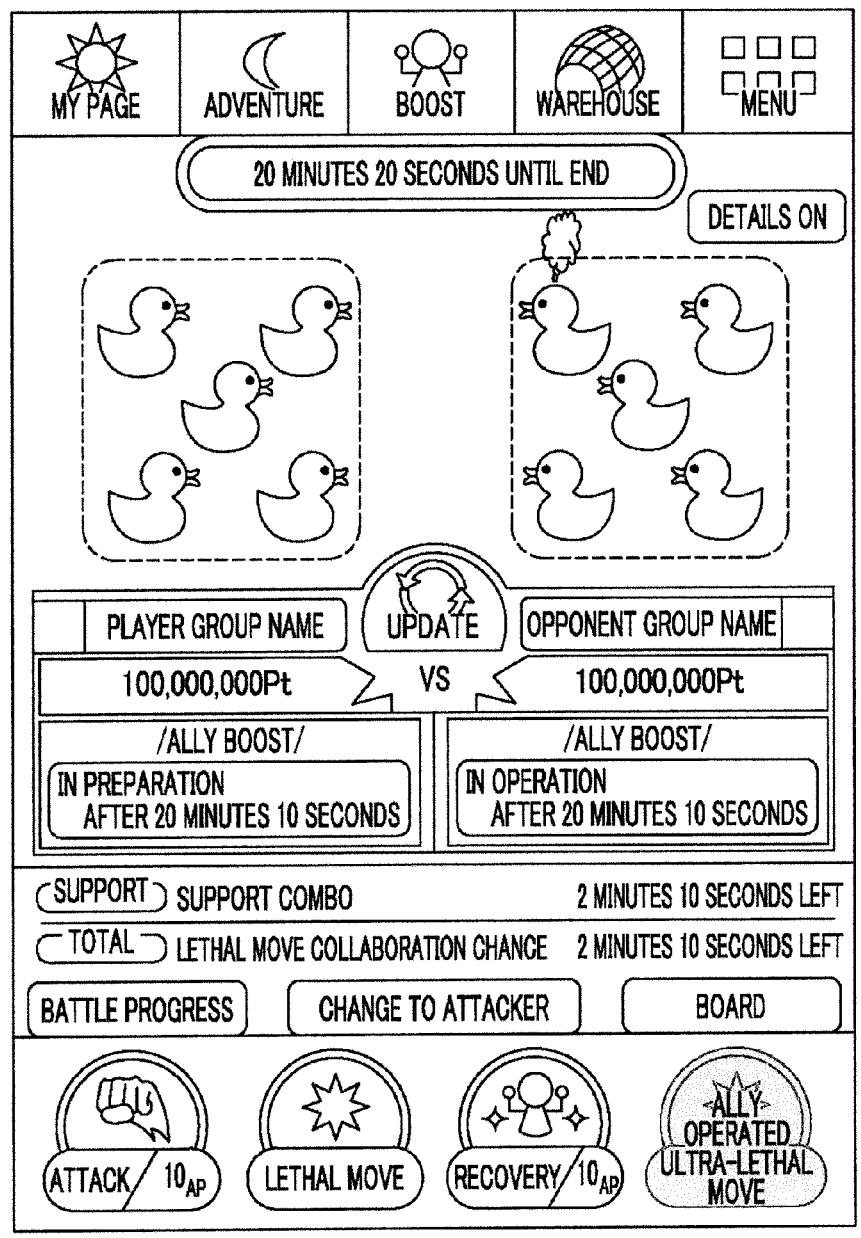
FIGS. 3A and 3B are schematic views showing an example of a game screen generated by the information processing apparatus.
Figure 3B:
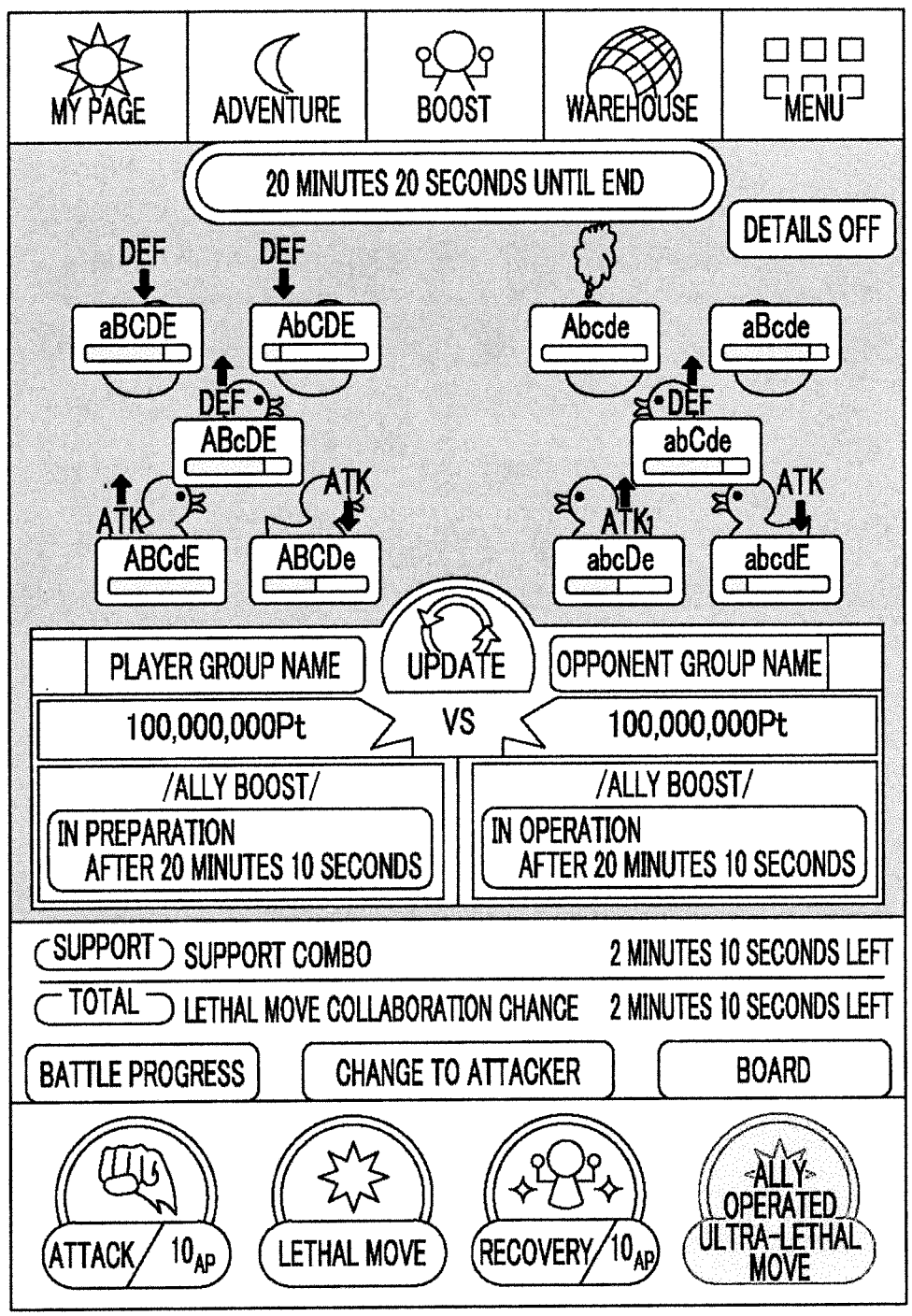
Figure 4A:
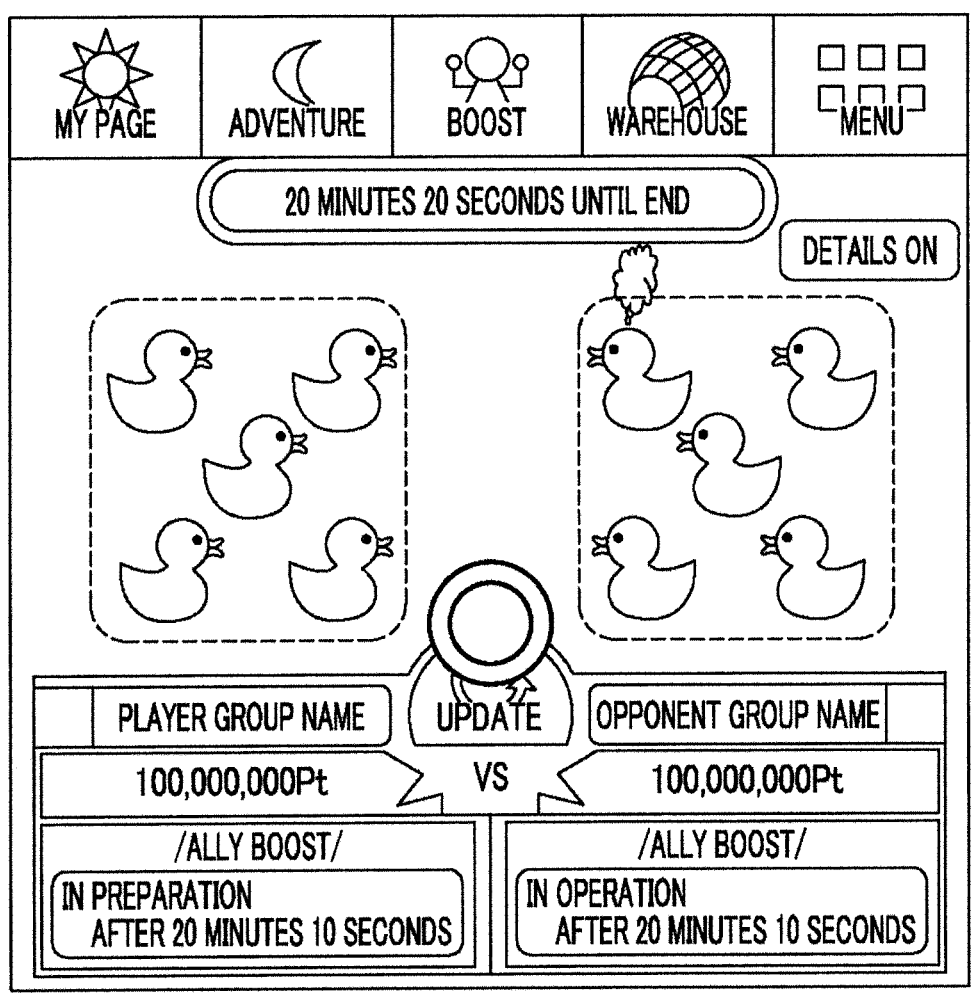
FIGS. 4A-4D are schematic views showing an example of a game screen generated by the information processing apparatus.
Figure 4B:
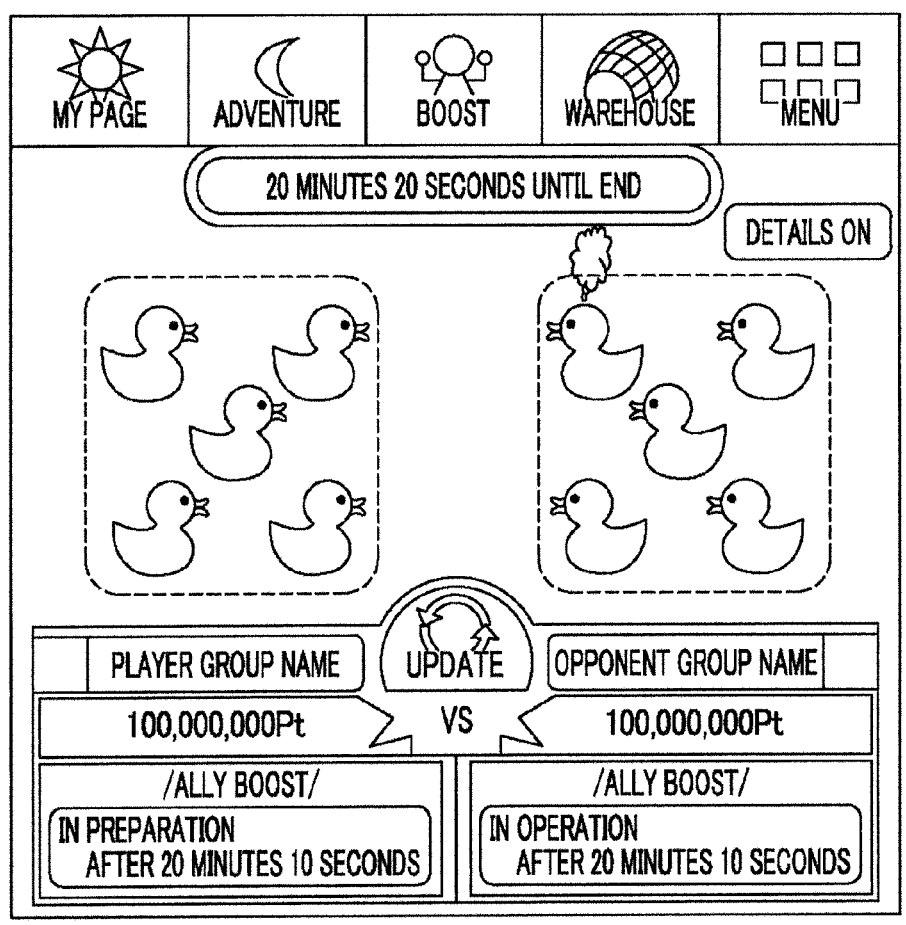
Figure 4C:
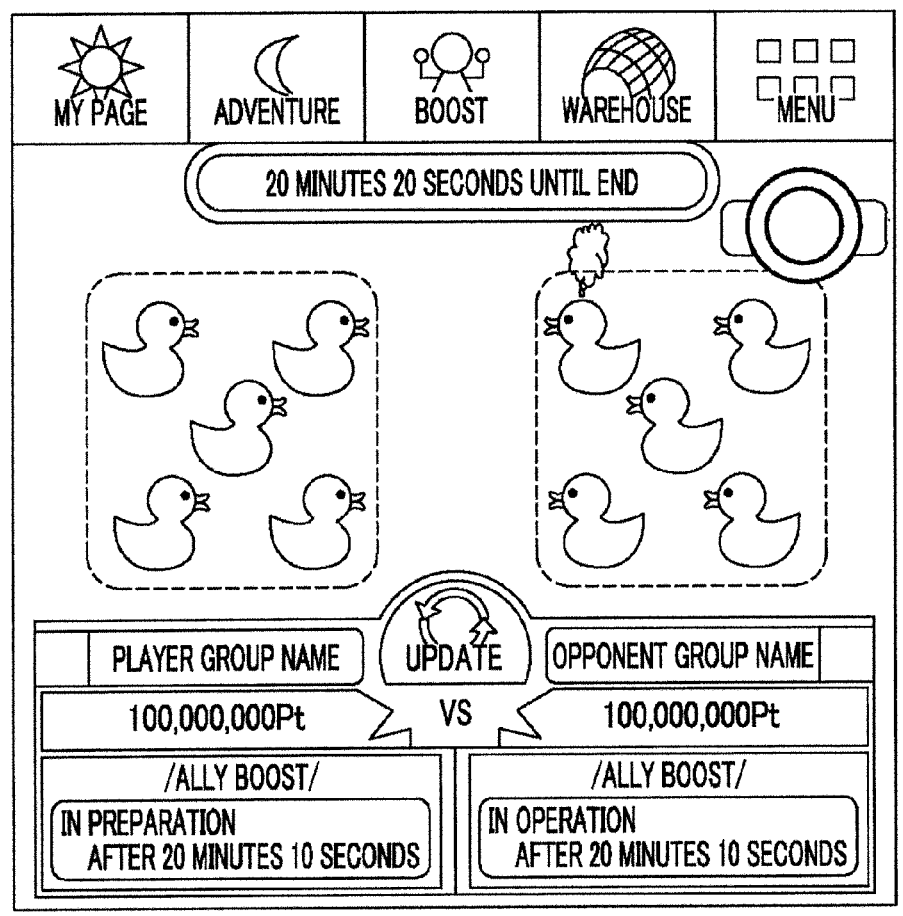
Figure 4D:
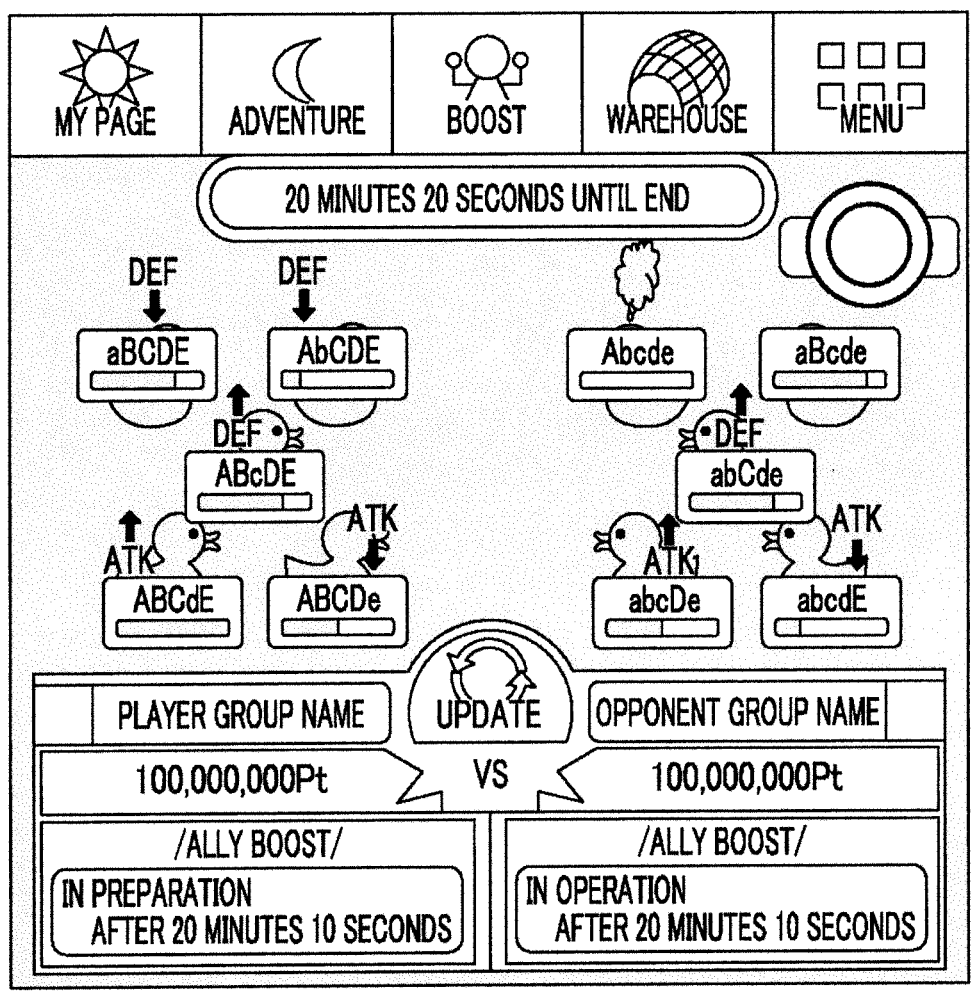

FIGS. 3A and 3B are schematic views showing an example of a game screen generated by the information processing apparatus. FIG. 3A shows the first game screen 200, and FIG. 3B shows the second game screen 300 having transparency on the first game screen 200 in a superimposed manner.

In the example shown in FIGS. 3A and 3B, a menu button and the like are arranged above a battle display region where the first game screen 200 and the second game screen 300 are displayed, and the attack button and the like are arranged below the battle display region. The update button is arranged at the center of the game screen and the switching button is arranged on the upper right side of the battle display region.

The arrangement position of the button should be designed such that user operation is easy, and not particularly limited.

The detailed configuration of the first game screen 200 and the second game screen 300 is as described above.

FIGS. 4A-4D are schematic views showing an example of a game screen generated by the information processing apparatus and show an example of screen transition by update operation and switching display operation.

As shown in FIGS. 4A-4D, if the update button of the first game screen 200 is tapped (a tapped point is indicated by double circle) (upper left), information is updated and the second game screen 300 is generated. At this time, a game screen to be displayed is the first game screen 200 as it is (upper right). Then, if the switching button is tapped (lower right), the second game screen 300 is displayed (lower left), and if the switching button is tapped again on the screen, the display of the second game screen 300 is eliminated and only the first game screen 200 is displayed (upper left).

In this way, generation of information relating to the second game screen 300 is performed at a time when there is a margin in the processing of the game, whereby it is possible to allow the game to progress without being affected by a communication state or hardware performance.

Subsequently, a game processing method will be described referring to the drawings.

Figure 5:
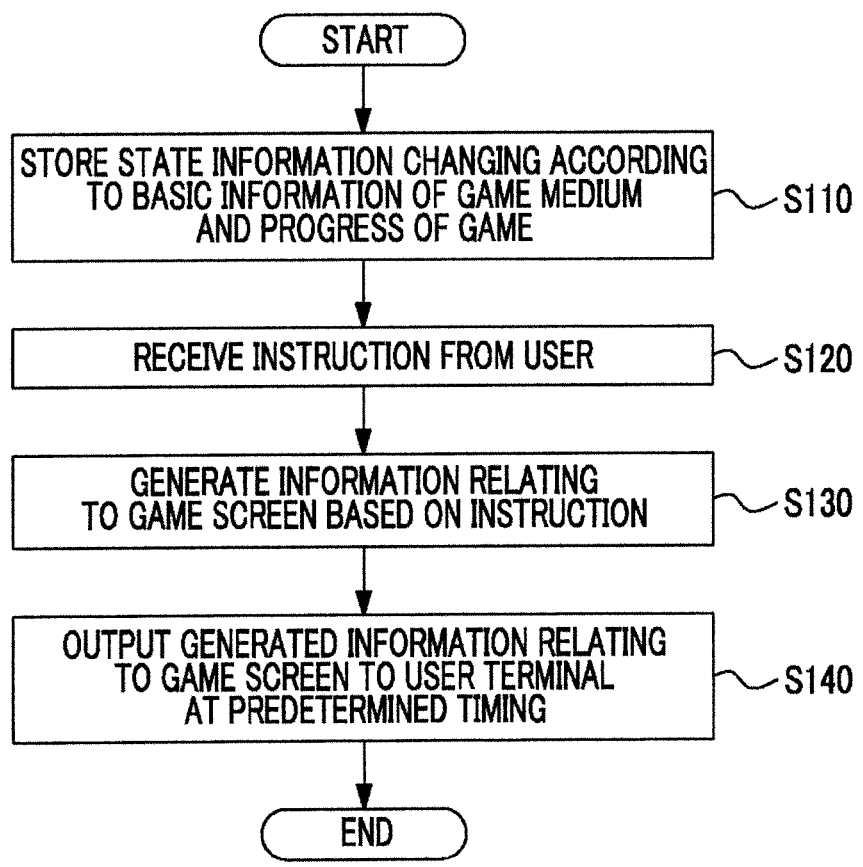
FIG. 5 is a flowchart illustrating the flow of a game processing method.

FIG. 5 is a flowchart showing an example of the flow of the game processing method. As shown in FIG. 5, the game processing method is a game processing method which processes the progress of a game using game contents, and includes a storage step S110, an instruction receiving step S120, a screen information generation step S130, and an output step S140.

In the storage step S110, storage means of an information processing apparatus stores basic information of the game contents and state information changing according to the progress of the game. The storage means can be the above-described storage unit 110. The details are as described above.

In the instruction receiving step S120, instruction receiving means of the information processing apparatus receives an instruction from a user. The instruction receiving means can be the above-described instruction receiving unit 120. The details are as described above.

In the screen information generation step S130, screen information generation means of the information processing apparatus generates information relating to a game screen based on the instruction received in the instruction receiving step S120. The screen information generation means can be the above-described screen information generation unit 130. The details are as described above.

In the output step S140, output means of the information processing apparatus outputs information relating to the game screen generated in the screen information generation step to a user terminal at a predetermined timing. The output means can be the above-described output unit 140. The details are as described above.

In the screen information generation step S130, information relating to a first game screen that displays the game contents and information relating to a second game screen that displays the state information of the game contents are generated. The details are as described above.

Then, in the game processing method, information relating to the second game screen includes the latest state information at the timing when a first instruction which is an instruction to update the state information is received in the instruction receiving step S120. The details are as described above.

Finally, a game program will be described.

There is provided a recording medium storing a game program which processes the progress of a game using game contents, the game program causing a computer to execute a storage function, an instruction receiving function, a screen information generation function, and an output function.

The storage device stores basic information of the game contents and state information changing according to the progress of the game. The storage device can be executed by the above-described storage unit 110. The details are as described above.

The instruction receiving device receives an instruction from a user. The instruction receiving device can be executed by the above-described instruction receiving unit 120. The details are as described above.

The screen information generator generates information relating to a game screen based on the instruction received by the instruction receiving device. The screen information generator can be executed by the above-described screen information generation unit 130. The details are as described above.

The output device outputs information relating to the game screen generated by the screen information generator to a user terminal at a predetermined timing. The output device can be realized by the above-described output unit 140. The details are as described above.

The screen information generator generates information relating to a first game screen that displays the game contents and information relating to a second game screen that displays the state information of the game contents. The details are as described above.

Then, in the game program, information relating to the second game screen includes the latest state information at the timing when the instruction receiving function receives a first instruction which is an instruction to update the state information. The details are as described above.

The game program can be provided in a state of being recorded in a computer-readable recording medium. The recording medium is not particularly limited, and a CD-ROM, a DVD, or the like may be used insofar as a recording medium is readable by the computer.

The game program can be created in, for example, a script language such as ActionScript or JavaScript (Registered Trademark), or an object-oriented programming language such as Objective-C or Java (Registered Trademark).

Alternatively, the game program may be created in, for example, a markup language such as HTML5.

The above description shows an example of a representative example, and this disclosure is not limited to the examples.

The invention claimed is:

1. A terminal apparatus comprising:
    a storage device that stores state information of game contents changing according to progress of a game;
    a screen information generator that generates first information relating to a display of the game contents on a display screen and second information relating to a display of the state information on the display screen;
    an output device that outputs the first information and the second information to the display screen at a predetermined timing, respectively; and
    an instruction receiving device that receives a switching instruction to switch between display of the game contents and display of the state information on the display screen,
    wherein the screen information generator generates the second information based on latest state information stored on the storage device at a time when receiving the switching instruction.

2. The terminal apparatus according to claim 1,
    wherein the screen information generator generates the second information including transparency information of the display screen of the state information, and
    the output device outputs the first information and the second information such that switching the display of the game contents and a superimposed display of the game contents and the state information is possible.

3. The terminal apparatus according to claim 1,
    wherein the output device outputs the first information and the second information such that switching the display of the game contents and of the state information is possible.

4. The terminal apparatus according to claim 1,
    wherein the instruction receiving device receives a selection of the state information to be included in the second information in the state information, and
    the screen information generator generates the second information based on the latest state information of the selected state information stored in the storage device.

5. The terminal apparatus according to claim 1,
    wherein the instruction receiving device receives a selection of an action in the game, and
    the screen information generator generates the second information based on the latest state information corresponding to the state information of the selected action stored in the storage device.

6. The terminal apparatus according to claim 1, wherein the switching display is performed in a non-communication state.

7. The terminal apparatus according to claim 1, wherein the storage device stores the state information of the game contents that changes in accordance with progress of the game in which a plurality of game contents including a game content corresponding to the terminal apparatus battle each other.

8. The terminal apparatus according to claim 1, wherein the terminal apparatus is a smart device including a touch panel as the instruction receiving device.

9. A method of controlling a computer that processes progress of a game using game contents, the method comprising:

storing state information of game contents changing according to progress of the game;

generating first information relating to a display of the game contents on a display screen and second information relating to a display of the state information on the display screen;

outputting the first information and the second information to the display screen at a predetermined timing, respectively; and receiving a switching instruction to switch between display of the game contents and display of the state information on the display screen, wherein the second information is generated based on latest state information stored at a time when receiving the switching instruction.

10. The method according to claim 9, wherein the second information including transparency information of the display screen of the state information is generated, and the first information and the second information are output such that switching the display of the game contents and a superimposed display of the game contents and the state information is possible.

11. The method according to claim 9, wherein the first information and the second information are output such that switching display of the game contents and of the state information is possible.

12. The method according to claim 9, wherein a selection of the state information to be included in the second information in the state information is received, and the second information based on the latest state information of the selected state information stored is generated.

13. The method according to claim 9, wherein a selection of an action in the game is received, and the second information is generated based on the latest state information corresponding to the state information of the selected action stored in the storage device.

14. A non-transitory recording medium recording a program for causing a computer to execute steps of:

storing state information of game contents changing according to progress of a game;

generating first information relating to a display of the game contents on a display screen and second information relating to a display of the state information on the display screen;

outputting the first information and the second information to the display screen at a predetermined timing, respectively; and receiving a switching instruction to switch between display of the game contents and display of the state information on the display screen, wherein the second information is generated based on latest state information stored at a time when receiving the switching instruction.

15. The non-transitory recording medium according to claim 14, the program for causing the computer to further execute steps of:

generating the second information including transparency information on the display screen of the state information, and outputting the first information and the second information such that switching the display of the game contents and a superimposed display of the game contents and the state information is possible.

16. The non-transitory recording medium according to claim 14, the program for causing the computer to further execute step of:

outputting the first information and the second information such that switching display of the game contents and the state information is possible.

17. The non-transitory recording medium according to claim 14, the program for causing the computer to further execute step of:

receiving a selection of the state information to be included in the second information in the state information, and generating the second information based on the latest state information of the selected state information.

18. The non-transitory recording medium according to claim 14, the program for causing the computer to further execute step of:

receiving a selection of an action in the game, and generating the second information based on the latest state information corresponding to state information of the selected action.

* * * * *